United States Patent Office 3,242,180
Patented Mar. 22, 1966

3,242,180
5-BENZOYLOXYURACIL COMPOUNDS
George H. Hitchings, Yonkers, and Gertrude B. Elion, Bronxville, N.Y., assignors to Burroughs Wellcome & Co. (U.S.A.), Inc., Tuckahoe, N.Y., a corporation of New York
No Drawing. Filed May 28, 1963, Ser. No. 283,681
Claims priority, application Great Britain, May 30, 1962, 20,844/62
10 Claims. (Cl. 260—260)

This invention relates to new 5-aroyloxyuracils and their biological activity. These compounds have been found to be active in the inhibition of antibody formation. This function is demonstrated by their ability to suppress the formation of haemagglutinins in mice following the injection of tanned sheep red blood cells. Moreover these compounds have been discovered to potentiate the activities of antimetabolic 6-substituted purines such as 6-mercaptopurine and 6-methylaminopurine when used in combination with them.

The 5-aroyloxyuracils of the present invention may be represented by the formula

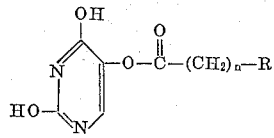

wherein R is selected from the class consisting of the cyclohexyl, naphthyl and phenyl radicals and phenyl radicals having lower alkyl, halogen, nitro and alkoxy substituents, and $n$ is an integer having values of from 0 to 2.

The biological activity of these novel 5-aroyloxyuracils makes them potentially valuable, for example, in prolonging the survival of transplanted organs and in controlling autoimmune diseases.

The following experiment illustrates the testing procedure and shows the anti-immune activity of 5-benzoyloxyuracil, for example. In these experiments, mice are injected intravenously with 0.25 ml. of a 30% suspension of tanned sheep red blood cells, and the compound is administered to the mice in 4 daily doses, beginning on the day of antigen administration. The serum haemagglutinin titre is measured on the 12th day. Activity of the compound is shown by a suppression of the haemagglutinin titre, an index of 0.60 or less being significantly different from the control value of 1.00. (See: H. C. Nathan, S. Bieber, G. B. Elion and G. H. Hitchings, "Detection of Agents Which Interfere With the Immune Response," Proceedings of the Society for Experimental Biology and Medicine (1961), 107, 796–799.)

The values of the index obtained with various doses of 5-benzoyloxyuracil and with 5-isobarbituric acid (of which 5-benzoyloxyuracil is an ester) are shown in the following table.

| Compound and dose (mg./kg.) | Index | No. of deaths and total No. of mice |
|---|---|---|
| 5-benzoyloxyuracil: | | |
| 50 | 0.74, 0.74 | 0/10 |
| 125 | 0.49 | 0/5 |
| 200 | 0.53 | 0/5 |
| 250 | 0.29 | 0/5 |
| Isobarbituric acid: 500 | 0.99 | 0/10 |

Unlike isobarbituric acid, 5-benzoyloxyuracil is active and non-toxic at doses from 125 mg./kg. to 250 mg./kg.

These 5-aroyloxyuracils may be produced by the reaction of isobarbituric acid with an aroyloxylating agent such as benzoyl chloride in the presence of a proton acceptor.

The novel 5-aroyloxyuracils may be presented as pharmaceutical formulations, singly or in combiantion with other active ingredients. They may advantageously be presented in discrete units, such as tablets, capsules, cachets, ampoules or suppositories, each containing a predetermined amount of the compound. They may also be presented as powders, or granules, as solutions or suspensions in an aqueous, non-aqueous or emulsified liquid, or as ointments. For parenteral use, the formulations must be sterile and are presented in sealed containers. The formulations of this invention may be made by any of the methods of pharmacy, and may include one or more of the following accessory ingredients: diluents, solutes, buffers, flavoring, binding, dispersing, surface-active, thickening, lubricating, and coating materials, preservatives, antioxidants, bacteriostats, suppository and ointment bases, and any other acceptable excipients.

The following examples illustrate the invention.

Example 1.—5-benzoyloxyuracil

Benzoyl chloride (11.2 g.) was added to a cold solution of isobarbituric acid (5 g.) in water (30 ml.) containing sodium hydroxide (3.12 g.). The solution was shaken vigorously until reaction of the benzoyl chloride was complete. The mixture was brought to pH 1 with hydrochloric acid, and the precipitate of 5-benzoyloxyuracil was collected, washed with water and dried at 60° C. in vacuo. After purification by recrystallization from 2-methoxyethanol and water, the product (7 g., 63 percent yield) had a decomposition point of 287° C. It is hydrolyzed by alkali.

Example 2

Tablets each containing 5-benzoyloxyuracil (50 mg.) were prepared as follows. A mixture of finely powdered 5-benzoyloxyuracil (50 parts), starch (30 parts) and lactose (20 parts) was granulated with an aqueous alcoholic gelatin solution. The granules were mixed with sufficient magnesium stearate and compressed on a suitable tabletting die.

Example 3.—5(2,6-dimethoxybenzoyloxy)uracil

A mixture of 5 g. of isobarbituric acid, 15.6 g. of 2,6-dimethoxybenzoyl chloride and 50 ml. of dry pyridine was heated under reflux conditions for 4 hours. The pyridine was removed under reduced pressure and the residue was triturated with 20 ml. of ethanol and 100 ml. of water. The crude precipitate (11.3 g.) was collected by filtration and purified by solution in 80 ml. of methyl cellosolve, treatment with Darco, and reprecipitation with 500 ml. of water. The 5-(2,6-dimethoxybenzoyloxy)uracil (7.5 g., 65.5 percent yield) melted at 267–269°.

The following compounds were prepared by the methods described in Example 1 or 3:

| Ex. No. | Name | M.P., °C. | Method |
|---|---|---|---|
| 4 | 5-(2-fluorobenzoyloxy)uracil | 270 | 1 |
| 5 | 5-(2-chlorobenzoyloxy)uracil | 298–300 | 1 |
| 6 | 5-(2-bromobenzoyloxy)uracil | 301–302 | 1 |
| 7 | 5-(2-iodobenzoyloxy)uracil | 303–305 | 1 |
| 8 | 5-methylbenzoyloxy)uracil | 261–262 | 1 |
| 9 | 5-(2-methoxybenzoyloxy)uracil | 200–206 | 3 |
| 10 | 5-(3-nitrobenzoyloxy)uracil | 300 | 1 |
| 11 | 5-(4-chlorobenzoyloxy)uracil | Not <350 | 1 |
| 12 | 5-(4-fluorobenzoyloxy)uracil | 331 dec | 1 |
| 13 | 5-(4-nitrobenzoyloxy)uracil | 335 dec | 1 |
| 14 | 5-(2-chloro-4-nitrobenzoyloxy)uracil | 262–263 | 1 |
| 15 | 5-(2,4-dichlorobenzoyloxy)uracil | 283–284 | 1 |
| 16 | 5-(2-chloro-5-nitrobenzoyloxy)uracil | 282–285 | 1 |
| 17 | 5-(2,6-dichlorobenzoyloxy)uracil | 313–315 | 1 |
| 18 | 5-(2,5-dichlorobenzoyloxy)uracil | 252–254 | 1 |
| 19 | 5-(3,4-dichlorobenzoyloxy)uracil | 330 | 1 |
| 20 | 5-(3,5-dichlorobenzoyloxy)uracil | 345 dec | 1 |
| 21 | 5-(1-naphthoxyloxy)uracil | 295–296 | 1 |
| 22 | 5-(2-naphthoyloxy)uracil | 313–314 dec | 3 |
| 23 | 5-phenylacetoxyuracil | 261–262 | 1 |
| 24 | 5-(2-chlorophenylacetoxy)uracil | 243 | 1 |
| 25 | 5-(2-phenylpropionoxy)uracil | 237–239 | 1 |
| 26 | 5-cyclohexylcarboxyoxyuracil | 283–284 | 1 |

Among the preferred compounds falling within the realm of the present invention are those having the formula

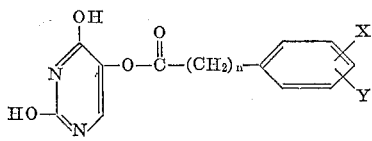

wherein X and Y are selected from the class consisting of hydrogen, lower alkyl, halogen, nitro, alkoxy and together include the system

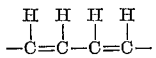

In such compounds the aromatic ring or rings may be reduced at the right.

What we claim is:
1. 5-benzoyloxyuracil.
2. 5-(2,6-dimethoxybenzoyloxy)uracil.
3. 5-(2-fluorobenzoyloxy)uracil.
4. 5-(2-chlorobenzoyloxy)uracil.
5. 5-(2-bromobenzoyloxy)uracil.
6. 5-(2-iodobenzoyloxy)uracil.
7. 5-(2-methylbenzoyloxy)uracil.
8. 5-(2-methoxybenzoyloxy)uracil.
9. 5-(3-nitrobenzoyloxy)uracil.
10. A compound of the formula

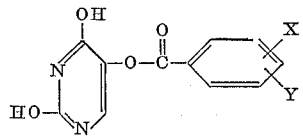

wherein X and Y are selected from the class consisting of hydrogen, lower alkyl, halogen, nitro and alkoxy.

References Cited by the Examiner
UNITED STATES PATENTS

| | | | |
|---|---|---|---|
| 2,036,649 | 4/1936 | Shwartzman | 167—78 |
| 2,948,725 | 8/1960 | Duschinsky et al. | 260—260 |
| 2,987,516 | 6/1961 | Holysz et al. | 260—260 |
| 3,097,141 | 7/1963 | Kidwell | 167—78 |

NICHOLAS S. RIZZO, *Primary Examiner.*
IRVING MARCUS, *Examiner.*